United States Patent
Petzold et al.

(10) Patent No.: US 7,195,258 B2
(45) Date of Patent: Mar. 27, 2007

(54) MOBILE THICK MATTER PUMP COMPRISING A SUPPORT CONSTRUCTION AND A PNEUMATIC AIR-CUSHIONED WHEEL AXLE

(75) Inventors: Wolf-Michael Petzold, Aichwald (DE); Gernot Göggelmann, Deizisau (DE)

(73) Assignee: Putzmeister Aktiengesellschaft, Aichwald (DE)

( * ) Notice: Subject to any disclaimer, the term of this patent is extended or adjusted under 35 U.S.C. 154(b) by 395 days.

(21) Appl. No.: 10/471,646

(22) PCT Filed: Feb. 27, 2002

(86) PCT No.: PCT/EP02/02054

§ 371 (c)(1),
(2), (4) Date: Sep. 12, 2003

(87) PCT Pub. No.: WO02/072409

PCT Pub. Date: Sep. 19, 2002

(65) Prior Publication Data

US 2004/0084859 A1    May 6, 2004

(30) Foreign Application Priority Data

Mar. 12, 2001    (DE)    ............... 101 12 084

(51) Int. Cl.
*B62D 61/12*    (2006.01)

(52) U.S. Cl. ............... 280/86.5; 280/6.155; 280/6.156; 280/763.1

(58) Field of Classification Search ............... 280/6.15, 280/6.153, 6.155–6, 86.5, 763.1, 764.1, 765.1, 280/766.1, 414.5, 418.1, 419, 475; 180/41, 180/271, 290, 906

See application file for complete search history.

(56) References Cited

U.S. PATENT DOCUMENTS

| 3,204,977 | A | * | 9/1965 | Eisenhauer et al. | ........ 280/81.6 |
| 3,704,896 | A | * | 12/1972 | Buelow | ............. 280/81.6 |
| 3,747,379 | A | * | 7/1973 | Cabanes | ............. 70/264 |
| 3,831,210 | A | * | 8/1974 | Ow | ............. 280/414.5 |
| 4,418,713 | A | * | 12/1983 | Schlecht | ............. 137/351 |
| 4,501,437 | A | * | 2/1985 | Becker | ............. 280/86.5 |
| 4,619,369 | A | * | 10/1986 | Mertens | ............. 212/304 |
| 4,643,370 | A | * | 2/1987 | Pierce | ............. 242/396.5 |
| 4,700,968 | A | * | 10/1987 | Cherry | ............. 280/86.5 |
| 4,854,409 | A | * | 8/1989 | Hillebrand et al. | ...... 180/24.02 |
| 4,910,634 | A | * | 3/1990 | Pipkorn | ............. 361/147 |
| 4,993,729 | A | * | 2/1991 | Payne | ............. 280/81.1 |
| 5,058,917 | A | * | 10/1991 | Richardson | ............. 280/86.5 |
| 5,090,495 | A | * | 2/1992 | Christenson | ............. 180/24.02 |
| 5,364,113 | A | * | 11/1994 | Goertzen | ............. 280/81.6 |
| 5,630,625 | A | * | 5/1997 | Shaw | ............. 280/838 |
| 5,748,097 | A | * | 5/1998 | Collins | ............. 340/686.1 |

(Continued)

*Primary Examiner*—Christopher P. Ellis
*Assistant Examiner*—Vaughn Coolman
(74) *Attorney, Agent, or Firm*—Akerman & Senterfitt; Stephan Pendorf

(57) ABSTRACT

A mobile viscous matter pump comprising a hydraulically operated support construction, a distribution boom (16) and a pneumatic cushioned trailing axle (42). To ensure stability during the pump operation, the trailing axle (42) can be lifted by means of a lifting element (58) by bleeding the pneumatic suspension, whereby the bleeding of the pneumatic suspension (44) and the operation of the lifting element (58) and a locking element (64) can be controlled according to the on-condition of the auxiliary drive (NA) of the vehicle motor, used to supply the hydraulic fluid of the drive hydraulics.

16 Claims, 3 Drawing Sheets

U.S. PATENT DOCUMENTS

| | | | |
|---|---|---|---|
| 5,961,145 A * | 10/1999 | Schillinger et al. | 280/764.1 |
| 6,276,718 B1 * | 8/2001 | Wolfram et al. | 280/765.1 |
| 6,293,586 B1 * | 9/2001 | Ebinger | 280/763.1 |
| 6,371,499 B1 * | 4/2002 | Konop | 280/86.5 |
| 6,390,504 B1 * | 5/2002 | Fetzer | 280/763.1 |
| 6,416,069 B1 * | 7/2002 | Ramsey | 280/124.116 |

* cited by examiner

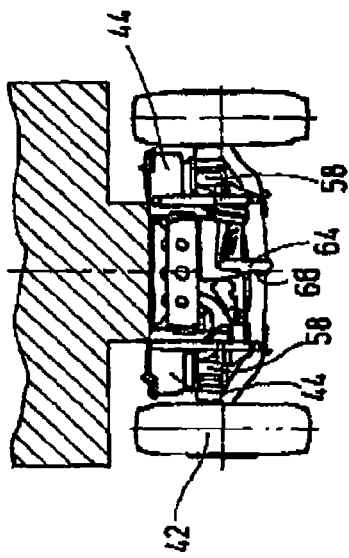
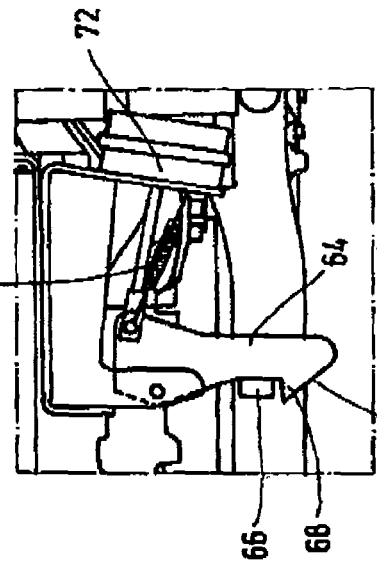
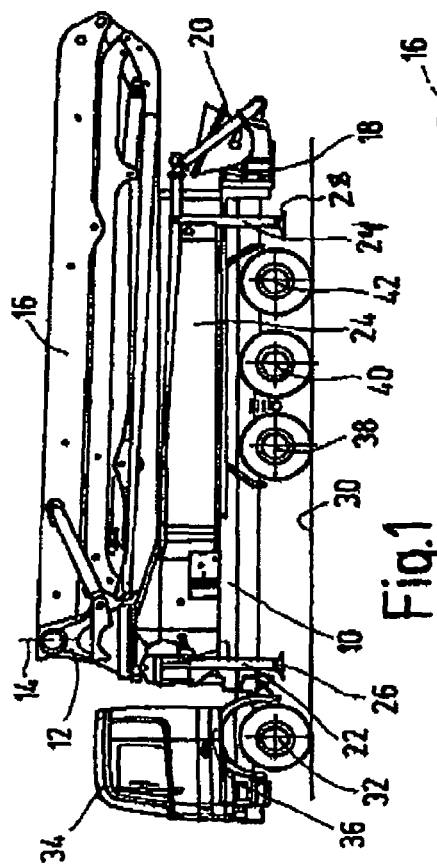
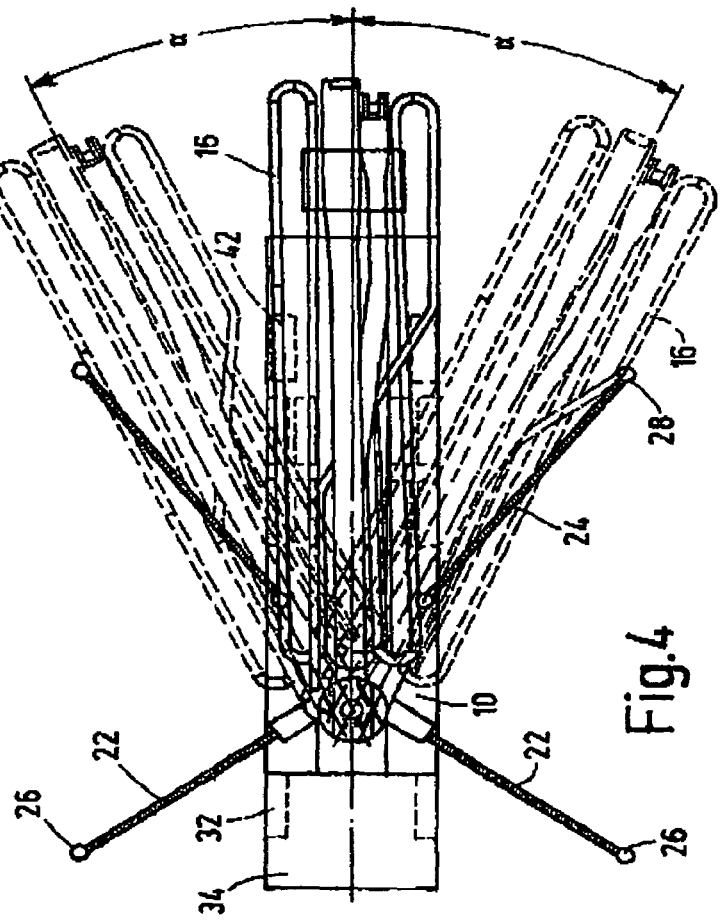

MOBILE THICK MATTER PUMP COMPRISING A SUPPORT CONSTRUCTION AND A PNEUMATIC AIR-CUSHIONED WHEEL AXLE

CROSS REFERENCE TO RELATED APPLICATION

This application is a national stage of PCT/EP02/02054 filed Feb. 27, 2002 and based upon DE 101 12 084.2 filed Mar. 12, 2001 under the International Convention.

BACKGROUND OF THE INVENTION

1. Field of the Invention

The invention concerns a mobile thick matter pump with a vehicle chassis including a vehicle motor, with multiple wheel axles associated with the vehicle chassis, of which at least one preferably non-driven wheel axle includes an air suspension comprised of compressed air operated lift spring elements, with a hydraulic operated support construction, which includes four support struts extendable between a transport position and a support position respectively supportable on the ground with a foot part, and with a hydraulic operated distribution boom, which can be extended from a transport position lying in folded-together configuration upon the vehicle chassis to a work position and there is pivotable via a boom rotation mechanism about a vehicle chassis-fixed vertical axis, wherein the drive hydraulics for the support struts and the distribution boom can be coupled to a selectively controllable auxiliary drive of the vehicle motor with disengagement of the vehicle propulsion.

2. Description of the Related Art

With mobile concrete pumps, it is known to use for the operation of the pump the already existing vehicle motor to drive the hydraulic fluid pumps. For this purpose the vehicle transmission or a cardanic shaft line of the vehicle associated distribution transmission includes an auxiliary drive for the operation of the pump. Further, mobile thick matter pumps must be set up stably on the construction site. For this, there is employed a hydraulic operated support assembly, which ensures that the wheels are lifted from the ground.

In the case of large size pumps, which additionally include a non-driven pneumatically sprung wheel axle, for example as a trailing axle, certain precautions must be taken at the construction site, in order to ensure stance stability in the case of a pivoted-out distribution boom.

SUMMARY OF THE INVENTION

Beginning therewith, it is the task of the present invention to provide in mobile thick matter pumps of the above-described type means to improve the stance stability at the construction site.

The inventive solution envisions that, for mobile thick matter pumps that are supported upon the ground with a support assembly, the pneumatic sprung rear axle is lifted from the ground. Air spring elements operated by compressed air are provided for the pneumatic suspension, which are purged in the case of lifting off from the ground. The actual lifting of the wheel axles occurs via pneumatic or hydraulic lift elements.

In order to ensure a stable and reliable supporting at the construction site, it is proposed in accordance with the invention that in a compressed air line leading to the air spring elements a first reversing valve is provided, which depending upon the on-condition of the auxiliary drive is switchable between a compressed air inlet and an atmospheric outlet. In this way it is ensured that the pneumatic spring elements are continuously provided with compressed air during vehicle operation and that the purging or venting only occurs upon switching from driving operations to construction site operations. In accordance therewith the first reversing valve is switched to the compressed air inlet in the case of switched off auxiliary drive and in the case of switched on auxiliary drive is switched to the atmospheric outlet. The first reversing valve is a one way spring biased directional valve pilot-controllable electro-magnetically by the auxiliary drive. In order to avoid an accidental venting of the pneumatic spring elements while the distribution boom is extended, a supplemental blocking valve is additionally provided in the compressed air line between the reversing valve and the pneumatic spring element, which closes when the distribution boom exceeds a predetermined minimal deflection in its rotation position from its transport position. For this, the boom rotation drive preferably includes a switch or sensor responsive during rotation of the distribution boom beyond a predetermined minimum angle relative to its transport position, via which the electro-magnetically pilot controllable locking or closing valve is lockable or closeable.

In order to be able to lift the pneumatic sprung wheel axle from the ground for the construction site operation, at least one lift element is provided engaging the rear axle, which in the on-condition of the auxiliary drive is acted upon with compressed air or hydraulic fluid causing lifting of the rear axle. For increasing the operational safety a second reversing valve is provided in the compressed air or hydraulic fluid line leading to the lift element, which depending upon the value of the on-condition of the auxiliary drive is switchable between a compressed air or hydraulic fluid inlet and an atmospheric outlet. Therewith the lift element can be filled and emptied depending upon the value of the on-condition of the auxiliary drive.

Since problems can occur in the area of the pneumatic spring elements and lift elements, there is supplementally provided in accordance with a preferred embodiment of the invention a mechanical locking element, which engages the pneumatic sprung rear axle or a part rigidly connected therewith in it's position when lifted from the ground. Preferably the locking element is connected with a pneumatic control element which is spring loaded in the locking direction and is acted upon with compressed air in the opening direction, wherein a third reversing valve is provided in a compressed air line leading to the control element, which depending upon the value or output of the on-condition of the auxiliary drive is controllable or switchable between a compressed air inlet and an atmospheric outlet. In the case of switched-on auxiliary drive the third reversing valve is necessarily switched to atmospheric outlet so that it is maintained in the locking position with the influence of the spring alone. Further, the boom rotational drive includes a switch or sensor which is activated upon rotation of the concrete distribution boom beyond a pre-determined minimum angle relative to its transport position, via which the third reversing valve also in the case of switched-off auxiliary drive is switchable to the atmospheric outlet. Therewith it is ensured that during a brief switching off of the auxiliary drive and extended distribution boom the pneumatic sprung rear axle remains lifted from the ground.

A further advantageous embodiment of the invention envisions that the locking element includes a sensor responsive to the locking configuration of the lifted pneumatic sprung rear axle, via which a supply valve located in the hydraulic fluid line of the drive hydraulic is controllable. Thereby it is ensured that the drive hydraulic for the support construction and the distribution boom can only function then when the air sprung rear axle is lifted from the ground. The sensor is thereby preferably a magnetic switch, responsive in the case of lifted rear axle to a permanent magnetic rigidly connected therewith.

The locking element is preferably a pivot hook, which includes a slanted or canted locking edge or surface for the rear axle lifted under the influence of the lift element.

BRIEF DESCRIPTION OF THE DRAWINGS

In the following the invention will be described in greater detail on the basis of an illustrated embodiment shown schematically in the figures. There is shown FIG. 1 a side view of a mobile concrete pump with pneumatic sprung trailing axle;

FIG. 2 a rear view of the pneumatic sprung rear axle with locking mechanism;

FIG. 3 an enlarged representation of the locking mechanism according to FIG. 2;

FIG. 4 a top view upon the mobile concrete pump with support construction and distribution boom in transport position and two pivoted-out positions;

DETAILED DESCRIPTION OF THE INVENTION

Figure 5A:
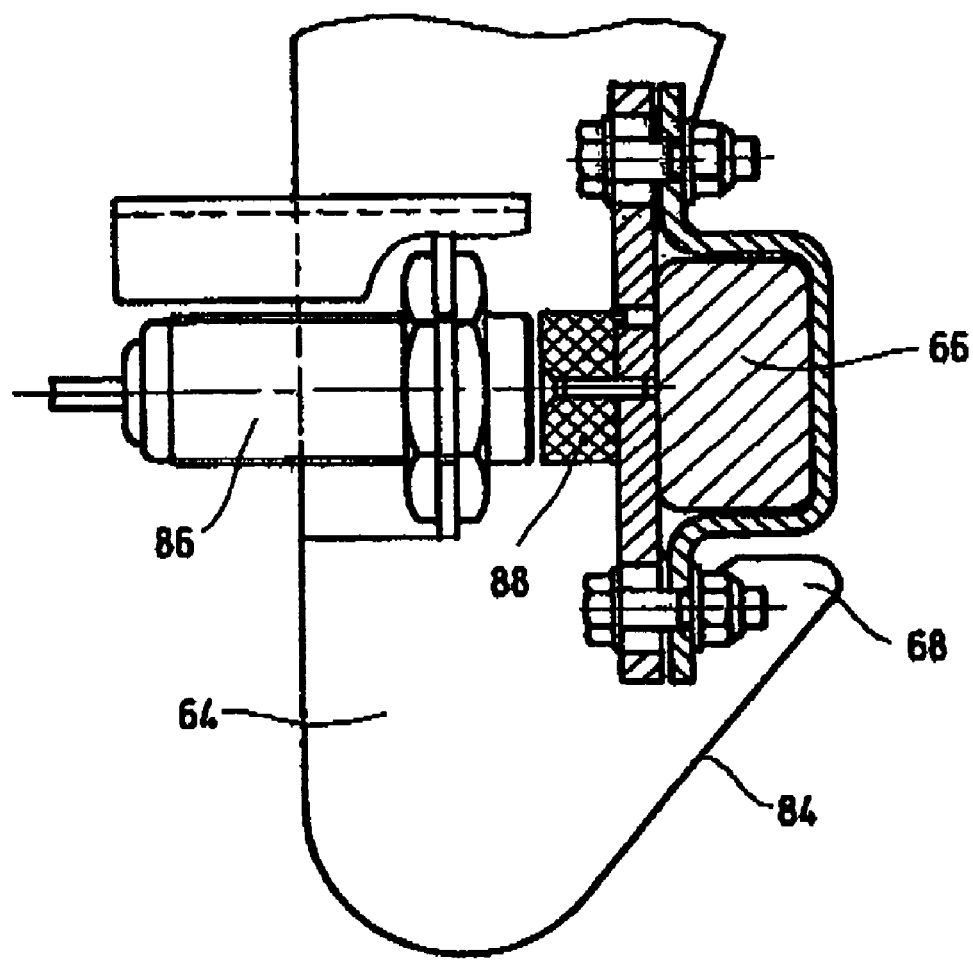
FIGS. 5a and b a side view and a top view of the locking mechanism according to FIG. 3 with safety sensor in partially sectioned representation.
Figure 5B:
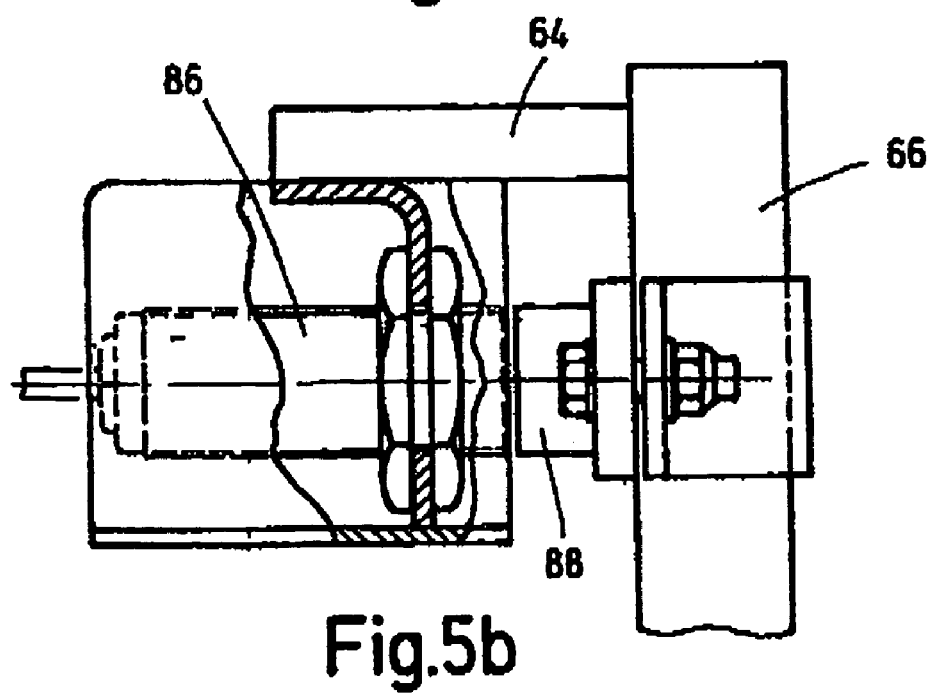

The mobile concrete pump shown in FIG. 1 in it's driving configuration and in FIG. 4 in it's supported configuration is comprised essentially of a four axle vehicle chassis 10, a distribution boom 16 mounted on a rotation assembly 12 located near the front axle and pivotable about a vehicle chassis-fixed vertical axis 14, a thick matter pump 18 with material supply container 20 and a support construction comprised of two forward and two rearward support struts 22, 24. The support struts 22, 24 are supportable on the ground 30 for lifting of the vehicle chassis 10 with respectively one extendable foot part 26, 28. The forward wheel axle 32 is located at the driver cabin 34, which also contains the vehicle motor 36. In the rear area of the vehicle chassis 10 there are two driven wheel axles 38, 40 as well as a not-driven pneumatic sprung trailing axle 42. The trailing axle 42 is pivotable in order to achieve a smaller turn radius, preferably frictionally steered or steered via a positive linkage. For the spring supporting of the trailing axle 42 on the vehicle chassis air spring elements 44 are provided as air spring elements which are operable with compressed air via a compressed air source 46 and a compressed air line 48.

In the supported configuration according to FIG. 4 the wailing axle 42 is lifted from the ground 30. It serves thereby as ballast and contributes to improving the stance stability. For lifting the trailing axle 42 the air spring elements 44 must be purged. For this there is employed a first reversing valve 50, which is selectively connectable to either a compressed air inlet 52 associated with the compressed air source 46 or an atmospheric outlet 54. Further, for lifting the trailing axle 42, a lift element comprised of two lift bellows 58 is provided, which is selectively connectable via a second reversing valve 60 selectively with a compressed air inlet 62 and an atmospheric outlet 64 such that the lifted trailing axle 42 while in the working position cannot descend to the ground 30 even in the case of problems with the pneumatic system. There is additionally provided a locking element 64 in the form of a catch hook, which engages under a projection 66 of the trailing axle 42 in its lifted position wit its hook part 68. The locking element 64 is pretensioned with a draw spring 70 in a locking position and is connected wit a control element 72 operable by compressed air towards the opening position. In the compressed air line 74 leading to the control element 72 there is a third reversing valve 76, which is selectively switchable between the compressed air inlet 78 and an atmospheric outlet 80.

The reversing valves 50, 60, 76 are electro-magnetic pilot controlled spring loaded which are collectively controllable via a relay 82 which is controlled during switching on of the auxiliary drive NA of the vehicle motor. The auxiliary drive NA of the vehicle motor is switched on by the pump operator when the driving operation is switched over to a pumping operation. The hydraulic pumps of the power hydraulics for the support struts 22, 24 and the distribution boom 16 are driven by the auxiliary drive. The trailing axle 42 may only be lifted when the motor operation or a distribution transmission located on a Cardanic line is switched to the auxiliary drive NA and the vehicle mobile operation is therewith precluded. As can be seen from FIG. 6, during the switched-on auxiliary drive the air spring elements 44 are vented via the atmospheric outlet 54 and the lift element 58 is charged via the compressed air inlet 62. Thereby, the trailing axle 42 is lifted from the ground 30. The locking element 64 is located in the switched on operation of the auxiliary drive with its hook part 68 in the capture position supported exclusively by the spring 70, since the pneumatic control element 72 is connected via the third reversing valve 76 with the atmospheric outlet 80. The projection 66 thus engages during lifting of the trailing axle 42 against the slanted surface 84 of the locking element 64 and pivots this against the force of the pull spring 70, until the locking element 64 can pivot back into its capture position (FIG. 3).

As can be seen from FIGS. 5a and b, a safety sensor 86 in the form of a magnetic switch is supplementally located on the locking element 64, which is responsive to a permanent magnet 88 located on one of the projections 66. The safety sensor 86 is a component of a circuit 90 on the central circuit board 92 of the mobile concrete pump, via which among other things a supply valve 94 is controlled, which controls the hydraulic fluid supply for the drive hydraulic for the support struts and the distribution boom. Therewith it can be ensured that the drive hydraulic can only be acted upon with hydraulic fluid when the trailing axle 42 is lifted from the ground and therewith a secure stance of the concrete pump is guaranteed.

Figure 6:
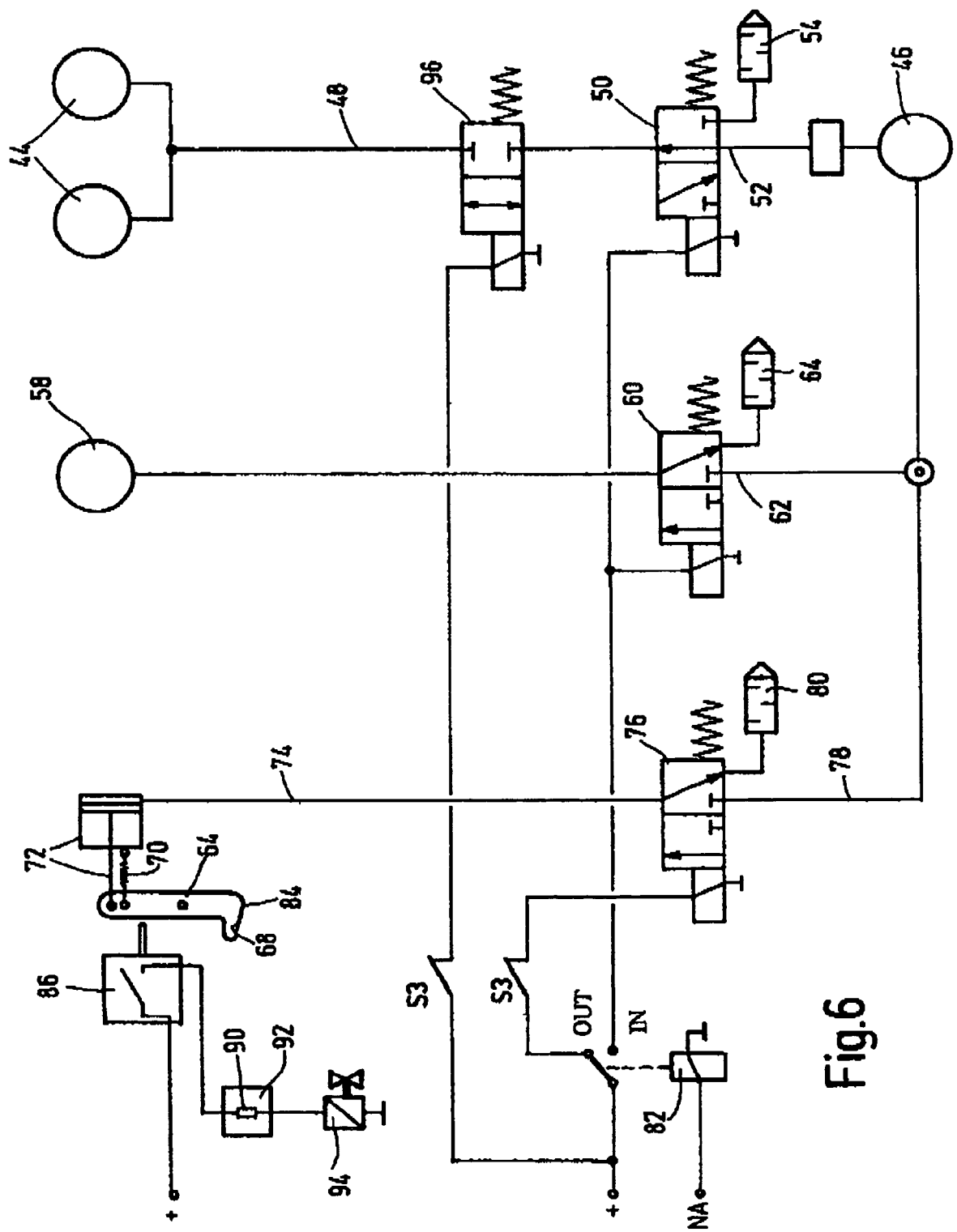
FIG. 6 a safety circuit for a pneumatic sprung trailing axle with catch hook.

Since the auxiliary drive NA of the vehicle motor can also be switched off for a time by the pump operator even while the distribution boom is in the extended configuration, there is additionally provided in the circuit according to FIG. 6 a safety switch S3, which is operated via the boom rotation drive 12. Therewith it is to be observed, that during switched-off auxiliary drive NA, without the switch S3 it cannot be determined whether the trailing axle 42 drops to the ground. If this is the case, then the stance stability of the mobile concrete pump can only be guaranteed if the distribution boom 16 is not within a narrow angle of $\pm\alpha$ from the transport position (see FIG. 4), wherein the angle $\alpha$ is approximately 10° to 20°. The switch S3 are openers, which are closed in the case of small pivot angles and open upon exceeding a predetermined boundary angle $\alpha$. In the circuit according to FIG. 6 this leads to the result that during turned off auxiliary drive NA the locking element 64 can only be pulled back from its locking position and the air spring element 44 can only then be acted upon by the supplemental closing valve 96 with compressed air when the distribution boom 16 is located close to its transport position. If the distribution boom in comparison is pivoted more than the threshold angle α, then the pneumatic control element 42 remains purged via the reversing valve 76 and the blocking or closing valve 96 is blocked against compressed air flow through.

In summary the following can be concluded: The invention concerns a mobile viscous matter pump comprising a hydraulically operated support construction, a distribution boom 16 and a pneumatic cushioned trailing axle 42. To ensure stability during the pump operation, the trailing axle 42 can be lifted by means of a lifting element 58 by bleeding the pneumatic suspension, wherein the bleeding of the pneumatic suspension 44 and the operation of the lifting element 58 and a locking element 64 can be controlled according to the on-condition of the auxiliary drive NA of the vehicle motor, used to supply the compressed oil of the drive hydraulics.

The invention was explained above for the case of an air sprung trailing axle. It is however not limited to this illustrated embodiment. It is basically also possible to apply the invention to mobile work machines, of which multiple or all wheel axles are pneumatic sprung and are provided with the described characteristics.

The invention claimed is:

1. A mobile thick matter pump with
    a vehicle chassis (10) including a vehicle motor (36),
    multiple wheel axles (32, 38, 40, 42) associated with the vehicle chassis (10), of which at least one wheel axle (42) includes a pneumatic spring comprised of compressed air operated air spring elements (44),
    a hydraulic operated support assembly including four support struts (22, 24) extendable between a transport position and a support position with respectively one foot parc (26, 28) supportable upon the ground (30), and
    a hydraulic operated distribution boom (16), which can be deployed from a transport configuration lying on the vehicle chassis to a work position and which is rotateable on a boom rotation mechanism (12) about a vehicle chassis fixed vertical axis,
    wherein the drive hydraulics for the support struts (22, 24) and the distribution boom (16) can be coupled with an auxiliary drive (NA) of the vehicle motor (36) selectively with switching off of the vehicle drive,
    wherein a first reversing valve (50) is provided in a compressed air line (48) leading to the pneumatic spring elements (44), which, depending upon the switched-on condition of the auxiliary drive (NA), is switchable between a compressed air inlet (52) and an atmospheric outlet (54).

2. A mobile thick matter pump according to claim 1, wherein the first reversing valve (50) is switched to the compressed air inlet (52) in the case of the switched off auxiliary drive (NA) and switched to the atmospheric outlet (54) in the case of the switched on auxiliary drive (NA).

3. A mobile thick matter pump according to claim 1, wherein the first reversing valve (50) is a one direction spring biased directional valve electro-magnetically pilot controlled by the switch-on condition of the auxiliary drive.

4. A mobile thick matter pump according to claim 1, including air spring elements (44) operable with compressed air via a compressed air source (46) and a compressed air line (48) for the spring supporting of the trailing axle (42) on the vehicle chassis, wherein a closing valve (96) is provided in the compressed air line (48) between reversing valve (50) and air spring elements (44), which is closeable depending upon the value of a predetermined minimum deflection (α) of the rotational position of the distribution boom (16) from its transport position.

5. A mobile thick matter pump according to claim 4, wherein the first reversing valve (50) is a one direction spring biased directional valve electro-magnetically pilot controlled by the switch-on condition of the auxiliary drive, and wherein the distribution boom rotation mechanism (12) includes a switch (S3) or sensor responsive during rotation of the distribution boom (16) beyond a predetermined minimum value (α) relative to its transport position, via which the electro-magnetically pilot controlled closing valve (96) is closeable.

6. A mobile thick matter pump according to claim 1, wherein ax least one pneumatic or hydraulic lift element (58) engages the air sprung wheel axle (42), and is operated with compressed air in the switched-on condition of the auxiliary drive (NA) with lifting of the respective wheel axle (42).

7. A mobile thick matter pump according to claim 6, wherein in a compressed air or hydraulic fluid line leading to the lift element (58) a second reversing valve (60) is provided, which depending upon the value of the switch-on condition of the auxiliary drive (NA) is switchable between a second compressed air inlet (62) and a second atmospheric outlet (63).

8. A mobile thick matter pump according to claim 1, whereby a mechanical locking element (64), which engages under the pneumatic sprung wheel axle (42) or with a part (66) rigidly connected therewith when the wheel axle (42) is lifted from the ground (30).

9. A mobile thick matter pump according to claim 8, wherein the locking element (64) is connected with a pneumatic operating element (72) which is spring biased in the locking direction and is operable by compressed air in the opening direction, and that a third reversing valve (76) is provided in a third compressed air line (74) leading to the operating element (72), which, depending upon the switch-on condition of the auxiliary drive (NA), is switchable between a third compressed air inlet (78) and a third atmospheric outlet (80).

10. A mobile thick matter pump according to claim 9, wherein the third reversing valve (76) is switched to the atmospheric outlet (80) in the case of switched-on auxiliary drive (NA).

11. A mobile thick matter pump according to claim 8, wherein the third reversing valve (76) is switched to the compressed air inlet (78) in the case of switched-off auxiliary drive (NA) while the distribution boom (16) is located in the transport position.

12. A mobile thick matter pump according to claim 9, wherein the distribution boom rotation mechanism (12) includes a switch or sensor (S3) responsive to the rotation of the distribution boom (16) beyond a predetermined minimum threshold angle (α) relative to its transport position, via which the third reversing valve (76) is switchable to the atmospheric outlet (80) in the case of switched off auxiliary drive (NA).

13. A mobile thick matter pump according to claim 8, wherein the locking element (64) includes a sensor (86) responsive to the locking configuration of the lifted pneumatic sprung rear axle (42), via which a supply valve (94) located in the hydraulic fluid line of the drive hydraulics is controllable.

14. A mobile thick mailer pump according to claim 13, wherein the sensor (86) is a magnetic switch, which is responsive to a permanent magnet (88) rigidly connected with the rear axle (42) in the lifted configuration thereof.

15. A mobile thick matter pump according to claim 8, wherein the locking element (64) is a pivot book, which includes a slanted rest or locking edge (84) for the rear axle (42) lifted under the influence of the lift connect (58).

16. A mobile thick matter pump according to claim 1 wherein the air sprung rear axle is a steerable trailing axle (42).

* * * * *

UNITED STATES PATENT AND TRADEMARK OFFICE
CERTIFICATE OF CORRECTION

PATENT NO. : 7,195,258 B2 Page 1 of 1
APPLICATION NO. : 10/471646
DATED : March 27, 2007
INVENTOR(S) : Wolf-Michael Petzold et al.

It is certified that error appears in the above-identified patent and that said Letters Patent is hereby corrected as shown below:

On the front page:

Item (73) Assignee should read: Putzmeister Aktiengesellschaft, Aichtal (DE)

Signed and Sealed this

Eleventh Day of December, 2007

JON W. DUDAS
*Director of the United States Patent and Trademark Office*